July 5, 1955 H. Q. NORTH 2,712,621

GERMANIUM PELLETS AND ASYMMETRICALLY CONDUCTIVE DEVICES PRODUCED THEREFROM

Filed Dec. 23, 1949

Inventor:
Harper Q. North,
by Paul A. Frank
His Attorney.

United States Patent Office 2,712,621
Patented July 5, 1955

2,712,621

GERMANIUM PELLETS AND ASYMMETRICALLY CONDUCTIVE DEVICES PRODUCED THEREFROM

Harper Q. North, Los Angeles, Calif., assignor to General Electric Company, a corporation of New York Application December 23, 1949, Serial No. 134,826
2 Claims. (Cl. 317—239)

Figure 1:
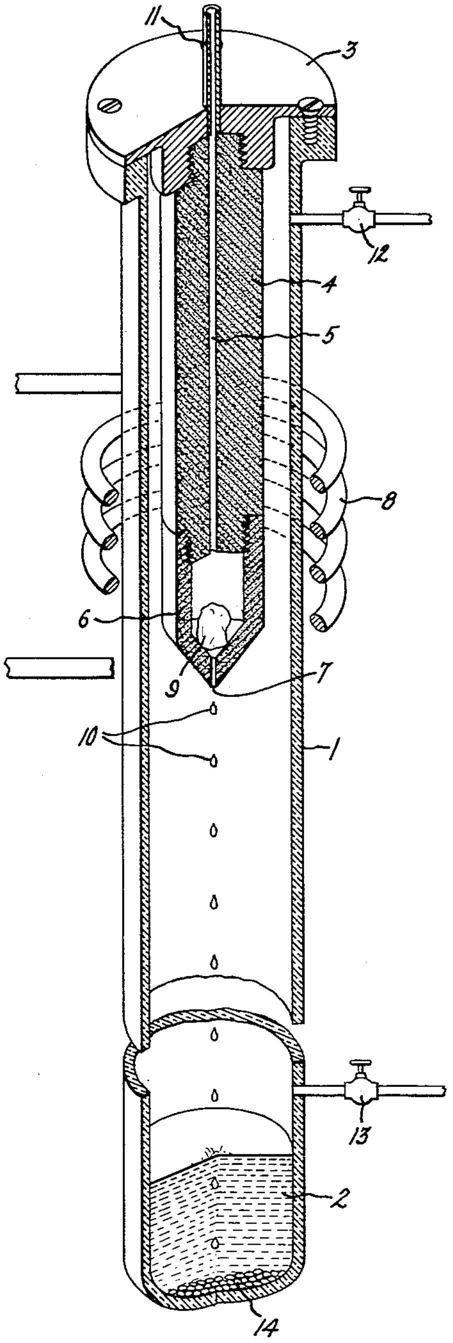

My invention relates to germanium members or units suitable for use in asymmetrically conductive devices, methods of producing such germanium units, and asymmetrically conductive devices constructed therewith.

In the preparation of germanium metal for use in asymmetrically conductive devices, such as diode rectifiers or triode amplifiers, the conventional method heretofore has been to cast highly purified germanium into relatively large ingots and to saw a useable portion of these ingots into rectangular or cylindrical wafers. Because of the small size of the wafers normally employed in such asymmetrically conductive devices, more than 50% of the weight of germanium ingot is usually lost in the cutting so that a great waste of this relatively expensive metal results. This method also requires considerable time and a high degree of skill, and there is a great danger of contaminating the highly purified germanium during the consequent handling of the ingot.

In addition, despite the small size of these wafers, in the order of 0.050 inch diameter, only a very small portion of their body actually contributes to the current conduction in the conventional point-contact type of asymmetrically conductive device. However, the cost of cutting these already small wafers into even smaller sections is greater than the saving of material which would thus be obtained. Therefore, there is also a great waste of germanium in that a much larger wafer is normally employed in such asymmetrically conductive devices than is absolutely necessary.

Furthermore, because of variations in the conduction characteristics of the germanium in different portions of the solidified ingot, the individual wafers have widely differing and unpredictable conductive properties necessitating the individual testing of each wafer and the rejection of a considerable number of the wafers as being below a required standard.

Accordingly, a principal object of my invention is to provide germanium units which are in the form of extremely small substantially spherical pellets which are suitable for use in asymmetrically conductive devices.

Another important object of my invention is to provide a method for producing germanium pellets of any desired size including extremely small pellets in the order of .015 inches diameter.

Another important object of my invention is to provide a method for producing germanium units which converts substantially all of the germanium ingot into useable pellets thereby eliminating the great waste due to cutting. It has been found that due to the reduction in the size of the pellets produced by my improved methods as well as to the elimination of cutting waste, approximately 100,000 pellets of useable size can be formed from an ingot that would normally yield approximately only 1,000 wafers.

Another object of my invention is to provide a method of making germanium units suitable for use in asymmetrically conductive devices which requires very little time or skill on the part of the operator and which may be mechanically controlled to a considerable extent.

Another object of my invention is to provide a method of making germanium units in the form of pellets which requires very little handling and therefore reduces the danger of contaminating the germanium with undesirable impurities.

An additional object of my invention is to provide a method of making germanium units in the form of pellets which results in great homogeneity of the electric conduction characterization of the individual pellets.

A further object of my invention is to provide asymmetrically conductive devices utilizing substantially spherical pellets of germanium, such as may be produced by my new method.

Broadly stated, in accordance with my invention, it has been found that substantially spherical pellets of properly processed germanium are suitable for use in properly constructed point-contact asymmetrically conductive devices. These pellets may be quickly and prolifically produced by using a "shot-tower" technique wherein droplets of melted germanium are transmitted through a chemically inert atmosphere into a liquid solidifying bath. Some of the properties of the original germanium are altered by this process but can be substantially restored, if desired, by a proper heat treatment.

The novel features which I believe to be characteristic of my invention are set forth with particularity in the appended claims. My invention itself, however, together with further objects and advantages thereof can best be understood by reference to the following description taken in connection with the accompanying drawings in which Fig. 1 is a cross-sectional view of a preferred apparatus which may be used in practicing my invention and Fig. 2 is a sectional view of a diode type asymmetrically conductive device utilizing the germanium pellets formed in accordance with my invention.

Figure 2:
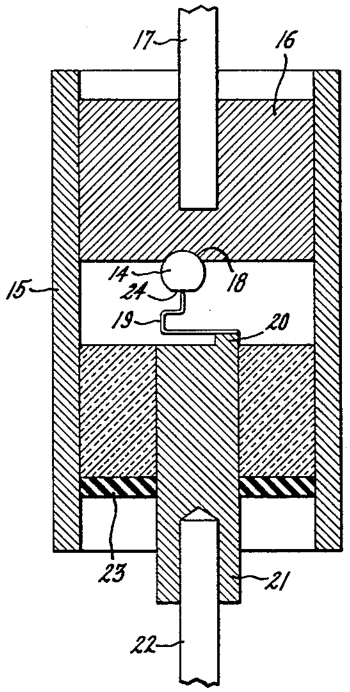

Referring to Fig. 1, I have shown an apparatus in which germanium units in the form of pellets may be produced. The specific apparatus shown in Fig. 1 is similar to the apparatus described and claimed in an application Serial No. 134,761 now Patent No. 2,595,780 of William C. Dunlap, Jr., filed concurrently with the present application and assigned to the same assignee. As shown in Fig. 1 this apparatus comprises a sealed quartz container 1 at the bottom of which a liquid bath 2, which may for example be distilled water, is located. Suspended within the upper end of the container 1 from a lid or cover 3 of the container 1 is a cylindrical graphite rod 4 having an axially extending hole 5 therethrough. Threaded to the bottom of rod 4 is a crucible 6 in which an ingot of germanium may be placed. The crucible 6 has a small hole or aperture 7 at the bottom thereof and is preferably composed of a material, such as graphite, which does not readily combine chemically with molten germanium. The crucible hole 7 is preferably about 0.020 inch in diameter although considerable variation of the diameter may be tolerated. The size of the hole 7, of course, determines to a great extent the size of the pellets that will be produced.

An induction heating coil 8 surrounds the quartz tube 1 adjacent crucible 6 and functions, in a well-known manner, to melt the germanium ingot within the crucible by the application of a high frequency magnetic field therethrough. It will be appreciated that many alternative means of heating the germanium within the crucible, such as an electric heating element surrounding the crucible itself, may alternatively be provided.

Means are also provided whereby the entire system may be flushed with a chemically inactive gas and the molten germanium within the crucible 6 may be subjected to suitable gas pressure to force the germanium out of the hole 7 in the form of droplets comprising a stream or spray. In Fig. 1, I have shown the germanium 9 within crucible 6 as being in a partially molten state and have shown a stream of droplets 10 being emitted from the crucible hole 7. The inert gas, which may, for example, be dry nitrogen or helium which does not readily combine with molten germanium, is fed into the container 1 through a gas inlet 11 extending through the lid 3 and communicating with the hole 5 which extends axially through the graphite rod 4. Gas outlet valves 12 and 13 are preferably provided at the top and bottom of the container 1 in order to allow the entire container 1 to be flushed out by the pressure of the inert gas.

It will be readily appreciated that until the germanium within the crucible 6 is melted, the gas entering through the inlet 11 will pass through the crucible hole 7 into the container 1 in order to enable this flushing action. As the germanium within the crucible 6 melts, it runs down the sides of the crucible and is forced out of the hole 7 by the pressure of the applied gas. The size of the germanium droplets as well as their rate of production depends upon the magnitude of this gas pressure as well as upon the size of the crucible hole 7. A pressure of approximately 9.5 centimeters of mercury has been found to give excellent results with a crucible hole in the neighborhood of .015 inch diameter. For optimum yield it is preferable that the size of the resulting pellets be kept less than .050 inch in diameter.

The droplets 10 are forced out of the crucible hole in the form of a stream or spray and fall through the previously established inert atmosphere within the container 1 into the liquid bath 2 below. If the bath 2 is one foot or more below the crucible 6, the droplets cool sufficiently as they fall so that they are not normally contaminated by the liquid bath 2 although distilled water or clean octoil is preferably employed as the bath in order to insure against such contamination. The droplets 10 are quickly quenched by the bath 2 and solidify into tiny pellets of germanium 14, as indicated, at the bottom of the container 1. By this method over 20,000 pellets of germanium have been produced within a few minutes after the germanium ingot begins to melt.

The rapid quenching of germanium pellets, however, tends to alter in the pellets many of the electro-chemical properties of the original germanium ingot. As is well-known, germanium may be classified into either "P-type" or "N-type" depending upon the type and sign of its conduction carriers. The two types of germanium can be easily distinguished by the direction of the sign of a Hall voltage produced in a given sample of germanium, by the direction of the sign of a thermoelectric voltage when the germanium is made into a thermocouple, and by the direction of easy current conduction when the germanium is used with a point-contact electrode. In each case, the effect produced using N-type germanium is opposite to that produced using P-type germanium. Highly purified germanium, however, can be converted into either N-type or P-type by the addition of extremely small quantities of known impurities which function either as "acceptor" impurities or "donor" impurities. The acceptor impurities produce P-type germanium apparently by removing electrons from the filled atomic shells of the germanium to enable "positive hole" conduction, while the donor impurities produce N-type germanium apparently by furnishing free electrons within the germanium to provide an increase in the conventional electronic conduction. When employed in point-contact asymmetrically conductive devices, the P-type germanium usually allows rather good conductivity in both directions and cannot operate with a high back voltage. Properly prepared N-type germanium, on the other hand, has an extremely non-linear conduction characteristic and can withstand high back voltages. As a consequence, N-type germanium is normally employed in such asymmetrically conductive devices.

It has been found that if the germanium 9 in the crucible 6 is N-type, the rapid quenching of the resultant pellets 14 by the liquid bath 2 usually converts this N-type germanium into pellets which exhibit P-type characteristics. This phenomena is considered to be the result of lattice distortions in the atomic structure of the germanium due to the rapid quenching which binds the normally free electrons of the N-type germanium within adjacent atomic shells of the germanium. It has also been found, however, that the original N-type characteristics of the germanium ingot can be substantially restored in the resultant pellets by subjecting the pellets to heat treatment at a temperature considerably below the melting point of the germanium; in the neighborhood of 500° C., for example, for an extended period of time, usually not less than two hours. This heat treatment may be termed an annealing process.

These minute N-type germanium pellets, formed in accordance with my above described method, have been found to produce asymmetrically conductive devices having substantially the same desirable rectification properties and current carrying capacity as the much larger and more difficult to produce wafer-type germanium units.

An asymmetrically conductive device of the diode type which utilizes one of the above formed germanium pellets as its controlling element is shown in Fig. 2. A shell 15 in the form of a cylindrical tube or sleeve, preferably metallic and about ¼ inch in diameter and about ½ inch in length, houses a cylindrical plug 16 of highly conductive metal, such as silver, within one end thereof. Embedded within this silver plug is a terminal or conductor 17, preferably copper, which extends axially from one end of the plug 16 as shown. A substantially spherical N-type germanium pellet 14, such as formed by my above-described method, is securely soldered to the pretinned inner surface of the metallic plug 16. In order to provide a rigid mounting and wide base contact between the pellet 14 and the silver plug 16, an indentation 18 is preferably formed in the surface of the plug 16 which functions to seat the pellet 14.

The point-contact is made to the surface of the pellet 14 by a "cat-whisker" electrode 19 of any suitable known type, such as tungsten, or platinum with 10% ruthenium. The cat-whisker electrode 19 is secured at one end to a lip 20 of a steel rod 21 by any suitable means, such as spot welding. The steel rod 21 extends axially within the shell 15 and is maintained firmly in place by an insulating bead 22, preferably glass, which is sealed to the shell 15 and to the steel rod 21. A conductor 22 is connected to the external end of the steel rod 21, and a mica washer 23, which fits firmly against the bead 22, is preferably inserted between the rod 21 and the shell 15. The cat-whisker electrode 19 may be about .0015 inch in diameter with an overall length before bending of about .1 inch and may be sharpened at the contact tip to a radius of about .00005 inch.

The contact surface of the germanium pellet 14 is preferably ground and polished before assembly within shell 15 to provide a flat surface of substantially optical smoothness. More specifically, after being soldered to the plug 16, the pellet 14 is dipped into a protective coating material such as stop-off lacquer of the type unaffected by etching solutions and the tip surface of the pellet 14 is ground away leaving a small exposed flat surface 24. The pellet 14 is then immersed in an etchant, preferably of 10% potassium hydroxide in water, in order to polish this exposed flat surface 24. As is well-known, the use of an etching solution to polish the contact surface of the germanium pellet improves the rectification characteristics of the asymmetrically conductive device considerably.

The manner of assembly of the above-type asymmetrically conductive device whereby a proper contact between the cat-whisker electrode 19 and the exposed flat surface 24 of the germanium pellet is established is well-known to the art, and is therefore not described herein. Once contact is established, the cat-whisker electrode 19 may be welded to the germanium pellet, if desired, in accordance with the method taught in the U. S. patent application Serial No. 743,492, filed April 24, 1947, now Patent No. 2,704,818, issued March 22, 1955 to Harper Q. North and assigned to the assignee of the present invention.

Figure 3:
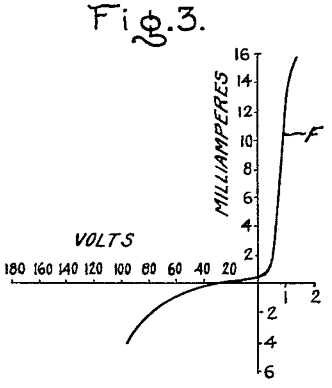

Referring to Fig. 3, I have shown a curve exemplary of the typical conduction characteristics of asymmetrically conductive devices, such as described in conjunction with Fig. 2, which employ germanium pellets in the order of .030 inch diameter. It will be noted that a high ratio of forward to reverse current prevails and that a peak inverse voltage in the neighborhood of 90 volts is usually withstood. It is evident, of course, that the type and purity of the germanium ingot employed to produce the pellets determines to a great extent the resultant conduction characteristics of the device.

It will thus be appreciated that I have provided a simple and economical method of producing a great number of germanium units in the form of tiny pellets which requires very little time, skill or handling on the part of the operator. In addition, I have provided an asymmetrically conductive device which utilizes such tiny germanium pellets and yet has good rectification characteristics. Although I have shown by invention in conjunction with a diode asymmetrically conductive device, it is equally applicable for use in multi-electrode asymmetrically conductive devices. It is, therefore, to be understood that although I have shown a particular apparatus for practicing my new method and a particular embodiment as an asymmetrically conductive device utilizing the germanium units constructed by my new method, many modifications may be made and I intend by the appended claims to cover all such modifications as fall within the true spirit and scope of my invention.

What I claim as new and desire to secure by Letters Patent of the United States is:

1. An asymmetrially conductive device comprising a semi-conductor and two electrodes in contact with said semiconductor, one electrode having substantially point contact with a surface of said semi-conductor, said semiconductor comprising a substantially spherical solidified pellet of a melted germanium droplet, said pellet being characterized by exhibiting low resistance to current flow therethrough in one direction and high resistance to current flow therethrough in an opposite direction between said electrodes.

2. An asymmetrically conductive device comprising a semi-conductor and a pair of electrodes in contact therewith, one electrode making substantially point contact with a surface of said semi-conductor, said semi-conductor comprising a solidified droplet of melted N-type germanium, said solidified droplet having a diameter no greater than .050 inch having been subjected to heat treatment at about 500° C. for at least two hours and being characterized by exhibiting low resistance to current therethrough in one direction and high resistance to current flow therethrough in an opposite direction between said electrodes.

References Cited in the file of this patent

UNITED STATES PATENTS

| | | |
|---|---|---|
| 2,157,498 | Reincoke et al. | May 9, 1939 |
| 2,269,528 | Gallup | Jan. 13, 1942 |
| 2,447,829 | Whaley | Aug. 24, 1948 |
| 2,510,574 | Greenhalegh | June 6, 1950 |
| 2,629,672 | Sparks | Feb. 24, 1953 |

FOREIGN PATENTS

| | | |
|---|---|---|
| 14,036 | Great Britain | Apr. 30, 1903 |
| 632,942 | Great Britain | Dec. 5, 1949 |
| 632,980 | Great Britain | Dec. 5, 1949 |

OTHER REFERENCES

"Preparation of High Voltage Germanium Crystals," NDRC Report 14-341, PB5200, page 11, declassified December 14, 1945.

"Further Developments in the Preparation and Heat Treatment of Germanium Alloys," NDRC Report No. 576; PB25, 734, October 31, 1945, declassified June 5, 1946. 11 pages.